United States Patent
Chern et al.

(10) Patent No.: US 10,310,275 B2
(45) Date of Patent: Jun. 4, 2019

(54) OPTICAL APPARATUS

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: EVERREADY PRECISION IND. CORP., Kaohsiung (TW)

(*) Notice: Subject to any disclaimer, the term of this patent is extended or adjusted under 35 U.S.C. 154(b) by 267 days.

(21) Appl. No.: 15/297,635

(22) Filed: Oct. 19, 2016

(65) Prior Publication Data
US 2017/0068098 A1 Mar. 9, 2017

Related U.S. Application Data (63) Continuation-in-part of application No. 14/987,517, filed on Jan. 4, 2016, now abandoned.

(30) Foreign Application Priority Data

Sep. 7, 2015 (TW) .............................. 104129539 A (51) Int. Cl.
| | |
|---|---|
| F21V 8/00 | (2006.01) |
| G02B 27/09 | (2006.01) |
| F21V 5/04 | (2006.01) |
| F21V 5/00 | (2018.01) |
| G02B 27/30 | (2006.01) |

(Continued)

(52) U.S. Cl.
CPC .......... *G02B 27/0927* (2013.01); *F21V 5/008* (2013.01); *F21V 5/04* (2013.01); *F21V 7/22* (2013.01); *G01B 11/2513* (2013.01); *G02B 13/16* (2013.01); *G02B 27/30* (2013.01)

(58) Field of Classification Search
None
See application file for complete search history.

(56) References Cited

U.S. PATENT DOCUMENTS 2,817,270 A * 12/1957 Mandler ............ G02B 17/0808
359/365
3,972,616 A * 8/1976 Minami ........... G01N 21/95623
356/71

(Continued)

FOREIGN PATENT DOCUMENTS

JP        2003084168 A * 9/2001 ............... G02B 6/32

*Primary Examiner* — Sharon E Payne
(74) *Attorney, Agent, or Firm* — Muncy, Geissler, Olds & Lowe, P.C.

(57) ABSTRACT

An optical apparatus includes a structured light generation unit, a conversion lens module, a collimating lens and a casing. The structured light generation unit outputs a structured light. The light beams from the structured light generation unit are expanded by the conversion lens module. The expanded light beams are collimated by the collimating lens. After the light beams pass through the conversion lens module and the collimating lens, the light beams are projected to a projection surface. Consequently, a structured light pattern is formed on the projection surface. All conversion lenses of the conversion lens module have negative optical power. Consequently, the area of the structured light pattern on the projection surface is wider. Moreover, the structured light generation unit and the conversion lens module can be accommodated within the casing having a smaller thickness.

11 Claims, 6 Drawing Sheets

(51) Int. Cl.
*F21V 7/22* (2018.01)
*G01B 11/25* (2006.01)
*G02B 13/16* (2006.01)

(56) References Cited

U.S. PATENT DOCUMENTS

| | | | | |
|---|---|---|---|---|
| 4,306,777 A | * | 12/1981 | Sternberg | G02B 3/04 |
| | | | | 359/718 |
| 4,962,993 A | * | 10/1990 | Okamoto | G02F 1/383 |
| | | | | 359/328 |
| 2001/0022691 A1 | * | 9/2001 | Furter | G03F 7/70066 |
| | | | | 359/629 |
| 2007/0109784 A1 | * | 5/2007 | Kosnik | F41G 1/35 |
| | | | | 362/260 |

* cited by examiner

OPTICAL APPARATUS

CROSS-REFERENCE TO RELATED APPLICATION

This application is continuation-in-part application of U.S. Pat. application Ser. No. 14/987,517, filed Jan. 4, 2016, for which priority is claimed under 35 U.S.C. § 120; and this application claims the priority of Application No. 104129539 filed in Taiwan on Sep. 7, 2015 under 35 U.S.C. § 119, the entire contents of all of which are hereby incorporated by reference.

FIELD OF THE INVENTION

The present invention relates to an optical apparatus, and more particularly to an optical apparatus for outputting a structured light.

BACKGROUND OF THE INVENTION

A structured light is a light with a specified pattern. Examples of the structured light include a linearized beam, a beam with a stripe pattern, or a beam with a grid pattern when the light is projected on a screen at some distance away. With increasing development of optical technologies, the structured light can be designed to have a linear pattern with narrower linewidth, a planar pattern with specially defined uniformity, a grid pattern with specified wide angle, or even a more complex light pattern. Consequently, the structured light can be applied to many fields such as 3D contour regeneration, distance measurement, anti-counterfeiting recognition, and so on. In other words, the importance of the structured light is gradually recognized, and it is useful to closely evaluate the associated technologies of structured light generation.

Figure 1:
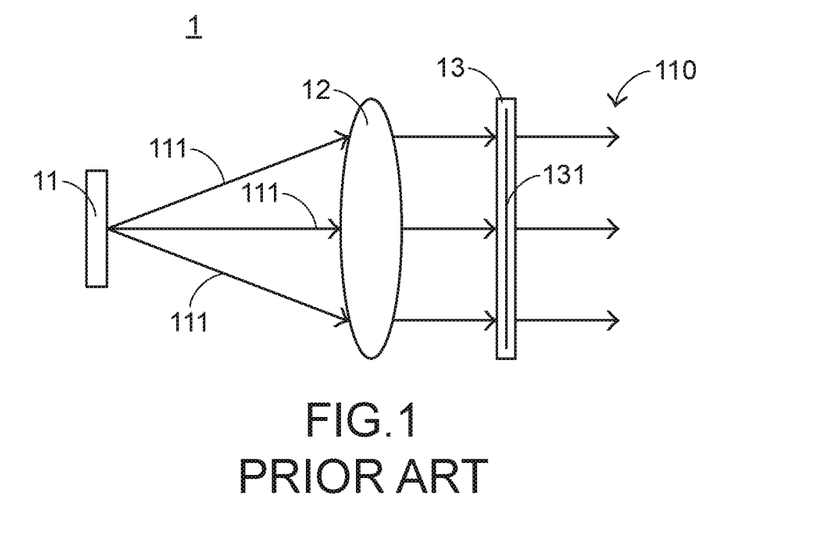
FIG. 1 is a schematic side view illustrating an inner portion of a conventional structured light generation unit.

FIG. 1 is a schematic side view illustrating an inner portion of a conventional structured light generation unit. As shown in FIG. 1, the structured light generation unit 1 comprises a light source 11, a collimating lens 12 and a diffractive optical element (DOE) 13. The light source 11 can emit plural light beams 111. The collimating lens 12 is arranged between the light source 11 and the diffractive optical element 13. The collimating lens 12 is used for collimating the plural light beams 111. A special pattern (projection pattern) 131 is embedded in the diffractive optical element (DOE) 13 to provide the structured light when the light beams 111 are incident thereon. The functions of DOE are achieved according to a diffraction theory, and the pattern can be quite complicated. Consequently, the coherent or partially coherent light can interact to form a new form of light. After the plural light beams 111 pass through the collimating lens 12 and the projection pattern 131, the structured light generation unit 1 generates a structured light 110 corresponding to the projection pattern 131.

Figure 2:
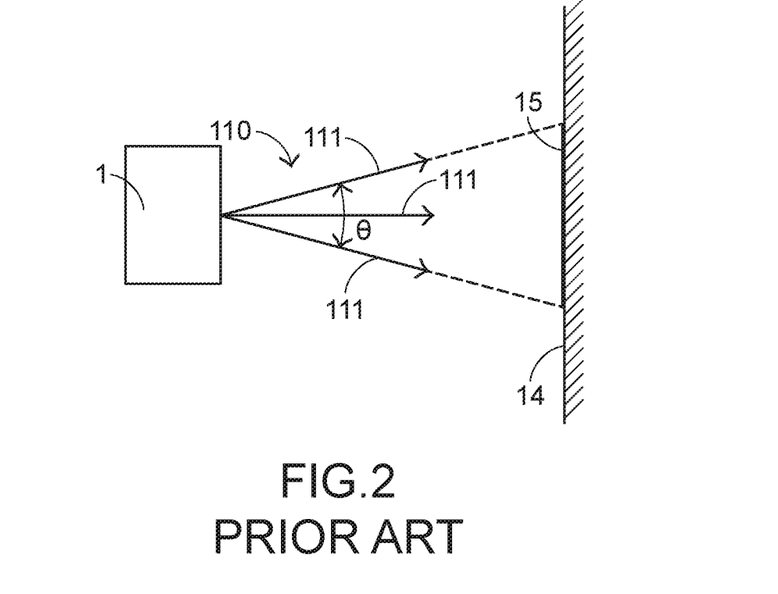
FIG. 2 is a schematic side view illustrating a structured light outputted from the conventional structured light generation unit.
Figure 3A:
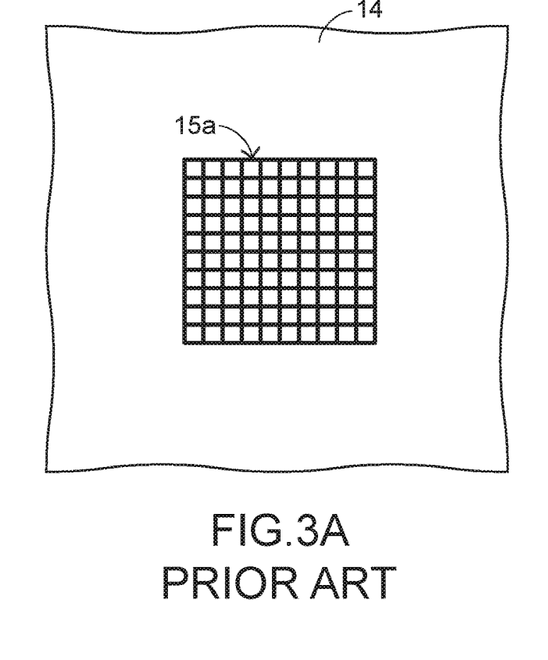
FIGS. 3A and 3B schematically illustrate two structured light patterns corresponding to the structured light from the conventional structured light generation unit, in which the distances between the structured light generation unit and the projection surface are different.
Figure 3B:
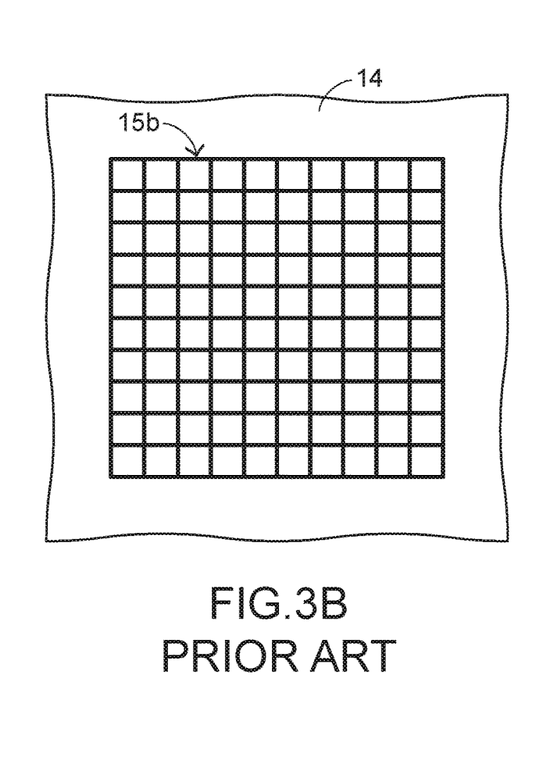

The operations of the structured light generation unit 1 will be illustrated as follows. FIG. 2 is a schematic side view illustrating a structured light outputted from the conventional structured light generation unit. According to the inner structure of the structured light generation unit 1, the structured light 110 is generated. When the light beams 111 of the structured light 110 is projected on a projection surface 14, a structured light pattern 15 corresponding to the structured light 110 is formed on the projection surface 14 in response to the plural light beams 111. That is, the structured light pattern 15 corresponding to the projection pattern 131 is formed on the projection surface 14. For example, the structured light pattern 15 is a grid pattern. As shown in FIG. 2, the structured light 110 outputted from the structured light generation unit 1 has a beam diffusion angle θ. Moreover, as the traveling distance of the light beams 111 of the structured light 110 increases, the coverage region of the structured light 2 is widened. That is, if the distance between the projection surface 14 and the structured light generation unit 1 is shorter, the structured light pattern 150a on the projection surface 14 is smaller (see FIG. 3A). Whereas, if the distance between the projection surface 14 and the structured light generation unit 1 is longer, the structured light pattern 15b on the projection surface 14 is larger (see FIG. 3B).

The selection of the size of the structured light pattern is determined according to the usage scenario of the user. Generally, the projected structured light pattern with high quality is required. That is, the efficiency of converting the incident light beams into the structured light should be as high as possible. In accordance with a key factor of increasing the efficiency, the beam distribution (or the light spot) of the plural light beams 111 from the light source 11 has to effectively cover the area of the projection pattern 131 of the diffractive optical element 13. In case that the beam distribution of the plural light beams 111 is slightly larger than or equal to the area of the projection pattern 131, the efficiency is high. Under this circumstance, the beam distribution of the plural light beams 111 can effectively match the diffractive optical element 13.

Figure 4:
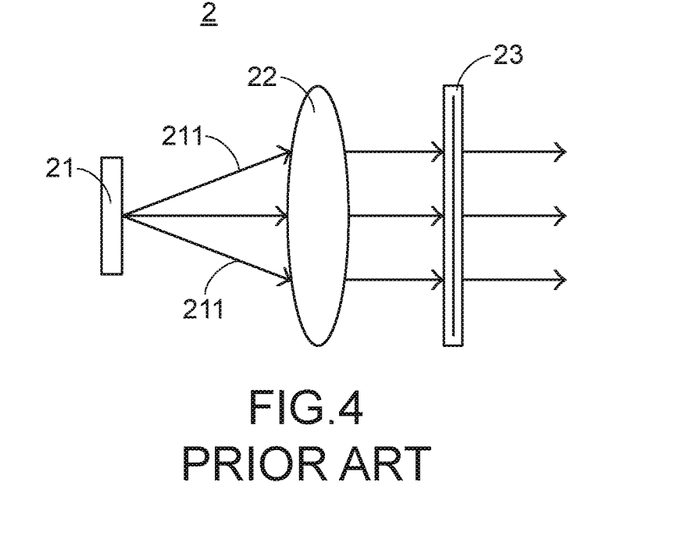
FIG. 4 is a schematic side view illustrating an inner portion of another conventional structured light generation unit.

With increased development of science and technology, the electronic device should have slim appearance in order to meet the user's requirements. FIG. 4 is a schematic side view illustrating an inner portion of another conventional structured light generation unit. The structured light generation unit 2 as shown in FIG. 4 is a small-sized structured light generation unit. The structured light generation unit 2 comprises a light source 21, a collimating lens 22 and a diffractive optical element 23. Except that the collimating lens 22 is closer to the light source 21 and the thickness of the structured light generation unit 2 is smaller, the function and structure of the structured light generation unit 2 are substantially identical to those of the structured light generation unit 1. Although the structured light generation unit 2 is thinner, some drawbacks occur. For example, since the distance between the light source 21 and the collimating lens 22 is too short, the beam distribution of the plural light beams 211 incident on the diffractive optical element 23 is smaller. For allowing the beam distribution of the plural light beams 211 to effectively match the diffractive optical element 23, the area of the diffractive optical element 23 has to be reduced. Under this circumstance, the generated structured light pattern is decreased. Moreover, the diffractive optical element 23 with the smaller area indicates that the demand on the assembling tolerance of the optical apparatus is increased. In other words, the assembling complexity is increased.

SUMMARY OF THE INVENTION

An object of the present invention provides a slim-type optical apparatus for generating a structured light pattern with an appropriate size.

Another object of the present invention provides a slim-type optical apparatus for allowing the beam distribution of plural light beams to effectively match the diffractive optical element.

In accordance with an aspect of the present invention, there is provided an optical apparatus. The optical apparatus includes a structured light generation unit, a conversion lens module, a collimating lens and a casing. The structured light generation unit outputs a structured light. The structured light generation unit includes at least one light source and an optical element group. The at least one light source emits plural light beams. The optical element group has a projection pattern. After the plural light beams pass through the projection pattern, the structured light is generated. The conversion lens module is arranged between the at least one light source and the optical element group. The conversion lens module is used for expanding the plural light beams. After the plural light beams pass through the conversion lens module, the plural light beams are projected on a projection surface, so that a structured light pattern is formed on the projection surface. The conversion lens module includes one or plural conversion lenses, and all of the conversion lenses have negative optical power. The collimating lens is located beside the conversion lens module. The expanded light beams are collimated by the collimating lens. The casing accommodates the structured light generation unit, the conversion lens module and the collimating lens.

In an embodiment, the conversion lens module includes one conversion lens, and the conversion lens module has a linear optical axis. The conversion lens has negative optical power along the optical axis. The collimating lens has positive optical power.

In an embodiment, the conversion lens module includes a first conversion lens and a second conversion lens, which are sequentially arranged from the at least one light source to the optical element group. The conversion lens module has a linear optical axis, both of the first conversion lens and the second conversion lens have negative optical power along the optical axis, and the collimating lens has positive optical power.

In an embodiment, the conversion lens module includes a first conversion lens, a second conversion lens and a third conversion lens, which are sequentially arranged from the at least one light source to the optical element group. The conversion lens module has a linear optical axis. All of the first conversion lens, the second conversion lens and the third conversion lens have negative optical power along the optical axis. The collimating lens has positive optical power.

In an embodiment, the conversion lens module includes a first conversion lens, a second conversion lens and a third conversion lens. The first conversion lens is located near the light source for expanding the plural light beams. The second conversion lens is arranged between the first conversion lens and the optical element group. After the plural light beams pass through the first conversion lens, the plural light beams are reflected by the second conversion lens. The third conversion lens is arranged between the first conversion lens and the optical element group. The reflected light beams from the second conversion lens are further reflected by the third conversion lens and then directed to the collimating lens.

In an embodiment, the conversion lens module is a free-form lens module, and the conversion lens module has a non-linear optical axis. When the plural light beams are incident on the optical element group, an included angle between the plural light beams and the optical element group is smaller than 5 degrees.

In an embodiment, a numerical aperture of the first conversion lens is smaller than 0.8, and the plural light beams have a rectangular beam distribution or a ring-shaped beam distribution.

In an embodiment, a first numerical aperture of the first conversion lens in a vertical direction is smaller than 0.6, and a second numerical aperture of the first conversion lens in a horizontal direction is smaller than 0.5, wherein the plural light beams have a rectangular beam distribution or a ring-shaped beam distribution.

In an embodiment, the first conversion lens is asymmetric with respect to the optical axis of the conversion lens module, and a curvature of the first conversion lens in a vertical direction and a curvature of the first conversion lens in a horizontal direction are different. Consequently, a beam distribution and a projecting direction of the light beams are controllable.

In an embodiment, at least one of the first conversion lens and the collimating lens has an anti-reflection coating, and at least one of the second conversion lens and the third conversion lens has a high reflective coating. Consequently, a beam distribution and a projecting direction of the plural light beams are controllable.

In an embodiment, the collimating lens is asymmetric with respect to the optical axis of the conversion lens module, and a curvature of the collimating lens in a vertical direction and a curvature of the collimating lens in a horizontal direction are different. Consequently, a beam distribution and a projecting direction of the light beams are controllable.

In an embodiment, the optical apparatus further includes a spatial filter. The spatial filter is arranged between the collimating lens and the optical element group or arranged between the at least one light source and the conversion lens module, wherein the spatial filter filters noise of the plural light beams.

In an embodiment, the optical element group includes a diffractive optical element, a refractive optical element and/ or a refractive array optical element.

In an embodiment, a thickness of the casing is smaller than 6 mm.

In accordance with another aspect of the present invention, there is provided an optical apparatus. The optical apparatus includes a structured light generation unit, a conversion lens module, a collimating lens and a casing. The structured light generation unit outputs a structured light. The structured light generation unit includes at least one light source and an optical element group. The at least one light source emits plural light beams. The optical element group has a projection pattern. After the plural light beams pass through the projection pattern, the structured light is generated. The conversion lens module is arranged between the at least one light source and the optical element group. The conversion lens module is used for expanding the plural light beams. After the plural light beams pass through the conversion lens module, the plural light beams are projected on a projection surface, so that a structured light pattern is formed on the projection surface. The collimating lens is located beside the conversion lens module. The expanded light beams are collimated by the collimating lens. The casing accommodates the structured light generation unit, the conversion lens module and the collimating lens. A thickness of the casing is smaller than 4 mm.

In an embodiment, the conversion lens module includes one conversion lens, and the conversion lens module has a linear optical axis. The conversion lens has negative optical power along the optical axis. The collimating lens has positive optical power.

In an embodiment, the conversion lens module includes a first conversion lens and a second conversion lens, which are sequentially arranged from the at least one light source to the optical element group. The conversion lens module has a linear optical axis, both of the first conversion lens and the second conversion lens have negative optical power along the optical axis, and the collimating lens has positive optical power.

In an embodiment, the conversion lens module includes a first conversion lens, a second conversion lens and a third conversion lens, which are sequentially arranged from the at least one light source to the optical element group. The conversion lens module has a linear optical axis. All of the first conversion lens, the second conversion lens and the third conversion lens have negative optical power along the optical axis. The collimating lens has positive optical power.

In an embodiment, the conversion lens module includes a first conversion lens, a second conversion lens and a third conversion lens. The first conversion lens is located near the light source for expanding the plural light beams. The second conversion lens is arranged between the first conversion lens and the optical element group. After the plural light beams pass through the first conversion lens, the plural light beams are reflected by the second conversion lens. The third conversion lens is arranged between the first conversion lens and the optical element group. The reflected light beams from the second conversion lens are further reflected by the third conversion lens and then directed to the collimating lens.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For overcoming the drawbacks of the conventional technologies, the present invention provides an optical apparatus.

Figure 5:
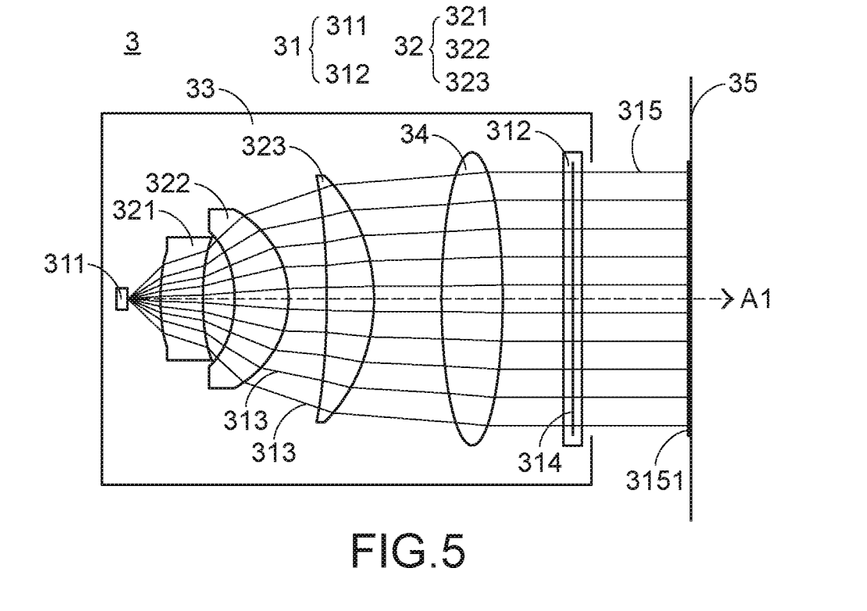
FIG. 5 is a schematic side view illustrating an optical apparatus according to a first embodiment of the present invention.

FIG. 5 is a schematic side view illustrating an optical apparatus according to a first embodiment of the present invention. As shown in FIG. 5, the optical apparatus 3 comprises a structured light generation unit 31, a conversion lens module 32, a casing 33 and a collimating lens 34. The structured light generation unit 31, the conversion lens module 32 and the collimating lens 34 are accommodated within the casing 33. In this embodiment, the structured light generation unit 31 comprises at least one light source 311 and an optical element group 312. The light source 311 is located at a first side of the conversion lens module 32. The light source 311 is used for emitting plural light beams 313. The optical element group 312 is located at a second side of the conversion lens module 32. Moreover, the optical element group 312 has a projection pattern 314. After the plural light beams 313 pass through the projection pattern 314, a corresponding structured light 315 is generated. In this embodiment, the light source 311 comprises a laser diode (LD), a light emitting diode (LED) and/or an organic light emitting diode (OLED). Moreover, the light beams from the light source 311 are light beams in a first wavelength range, light beams in a second wavelength range and/or light beams in a thermal band.

The conversion lens module 32 is arranged between the light source 311 and the optical element group 312. The conversion lens module 32 is used for expanding the plural light beams 313. Consequently, after the light beams 313 pass through the conversion lens module 32, the collimating lens 34 and the optical element group 312, the light beams 313 are projected on a projection surface 35 outside the casing 33. Consequently, a structured light pattern 3151 is formed on the projection surface 34. The conversion lens module 32 has a linear optical axis A1. Moreover, in this embodiment, the conversion lens module 32 comprises three conversion lenses. That is, the conversion lens module 32 comprises a first conversion lens 321, a second conversion lens 322 and a third conversion lens 323. The first conversion lens 321, the second conversion lens 322 and the third conversion lens 323 are used for expanding the light beams 313, so that the distribution of the light beams 313 is widened. The collimating lens 34 is located at the second side of the conversion lens module 32, and arranged between the third conversion lens 323 and the optical element group 312. The collimating lens 34 is used for collimating the expanded light beams 313. Consequently, the plural light beams 313 are substantially in parallel with the optical axis A1

In this embodiment, the three conversion lenses 321, 322 and 323 are sequentially arranged from the light source 311 to the optical element group 312 along the optical axis A1. Preferably but not exclusively, the three conversion lenses 321, 322 and 323 have negative optical power, negative optical power and negative optical power, respectively. That is, the signs of the optical power are (−, −, −). Moreover, the collimating lens 34 has positive optical power. The optical element group 312 comprises a diffractive optical element (DOE), a refractive optical element and/or a refractive array optical element.

As mentioned above, the three conversion lenses 321, 322 and 323 of the optical apparatus 3 have negative optical power. The conversion lenses 321, 322 and 323 can expand the plural light beams 313 in order to generate a wider beam distribution. The expanded light beams 313 are collimated by the collimating lens 34 with the positive optical power. After the plural light beams 313 with the wider beam distribution strike the optical element group 312 and pass through the projection pattern 314 of the optical element group 312, the structured light 315 is generated. Moreover, after the structured light 315 is projected on the projection surface 35, the wider structured light pattern 3151 is formed on the projection surface 35. As known, the conventional optical apparatus needs a large casing to accommodate a Kepler lens. Since the optical apparatus 3 uses the three negative-power conversion lenses 321, 322 and 323 and the positive-power collimating lens 34 to expand and collimate the plural light beams 313, the optical apparatus 3 of the present invention does not need the large casing. In other words, the optical apparatus of the present invention can generate an appropriate or lager structured light pattern while maintaining the slim appearance. In an embodiment, the thickness of the casing 33 is smaller than 6 mm. Preferably, the thickness of the casing 33 is smaller than 4 mm.

Figure 6:
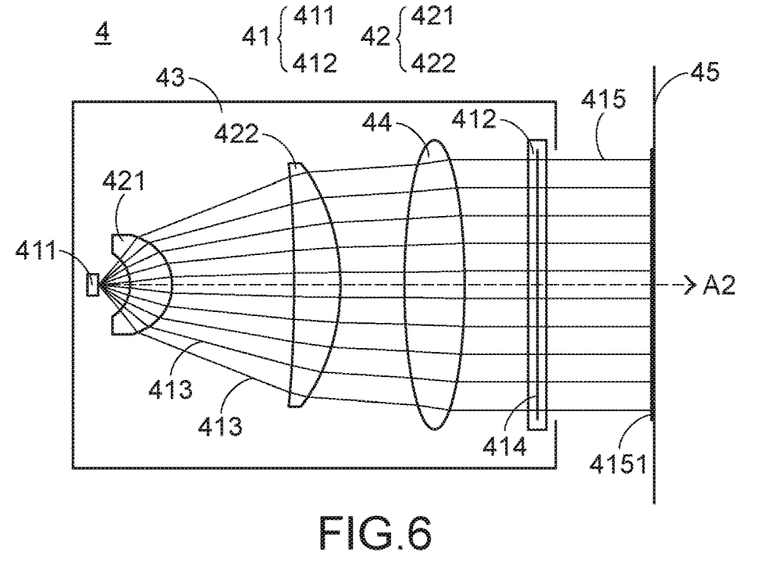
FIG. 6 is a schematic side view illustrating an optical apparatus according to a second embodiment of the present invention.

The present invention further provides a second embodiment, which is distinguished from the first embodiment. FIG. 6 is a schematic side view illustrating an optical apparatus according to a second embodiment of the present invention. As shown in FIG. 6, the optical apparatus 4 comprises a structured light generation unit 41, a conversion lens module 42, a casing 43 and a collimating lens 44. In this embodiment, the structured light generation unit 41 comprises at least one light source 411 and an optical element group 412. Moreover, the optical element group 412 has a projection pattern 414. Except for the structure of the conversion lens module 42, the structures of the optical apparatus 4 of this embodiment are substantially identical to those of the optical apparatus 3 of the first embodiment.

The conversion lens module 42 is arranged between the light source 411 and the optical element group 412. The conversion lens module 42 is used for expanding the plural light beams 413 that are outputted from the light source 411. After the light beams 413 pass through the conversion lens module 42 and the collimating lens 44, the light beams 413 are projected on a projection surface 45 outside the casing 43. Consequently, a structured light pattern 4151 is formed on the projection surface 45. The conversion lens module 42 has a linear optical axis A2. In this embodiment, the conversion lens module 42 comprises two conversion lenses. That is, the conversion lens module 42 comprises a first conversion lens 421 and a second conversion lens 422. The first conversion lens 421 and the second conversion lens 422 are used for expanding the light beams 413, so that the distribution of the light beams 413 is widened. The collimating lens 44 is used for collimating the plural light beams 413, so that the plural light beams 413 are substantially in parallel with the optical axis A2. In this embodiment, the two conversion lenses 421 and 422 are arranged from the light source 411 to the optical element group 412 along the optical axis A2. The two conversion lenses 421 and 422 have negative optical power and negative optical power, respectively. That is, the signs of the optical power are (−, −). Moreover, the collimating lens 44 has positive optical power.

Figure 7:
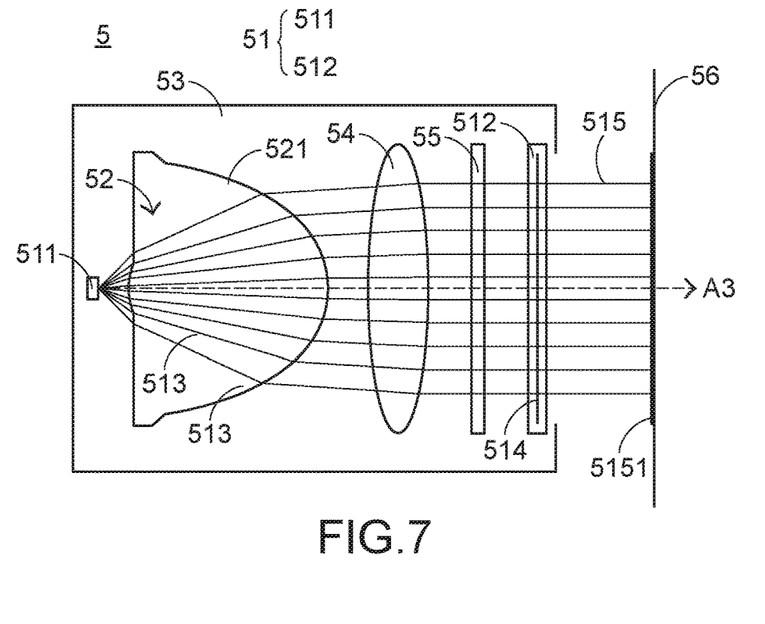
FIG. 7 is a schematic side view illustrating an optical apparatus according to a third embodiment of the present invention.

The present invention further provides a third embodiment, which is distinguished from the above embodiments. FIG. 7 is a schematic side view illustrating an optical apparatus according to a third embodiment of the present invention. As shown in FIG. 7, the optical apparatus 5 comprises a structured light generation unit 51, a conversion lens module 52, a casing 53, a collimating lens 54 and a spatial filter 55. In this embodiment, the structured light generation unit 51 comprises at least one light source 511 and an optical element group 512. Moreover, the optical element group 512 has a projection pattern 514. Except that the structure of the conversion lens module 52 is distinguished and the optical apparatus 5 further comprises the spatial filter 55, the structures of the optical apparatus 5 of this embodiment are substantially identical to those of the optical apparatus 3 of the first embodiment.

Firstly, the conversion lens module 52 is arranged between the light source 511 and the optical element group 512. The conversion lens module 52 is used for expanding the plural light beams 513 that are outputted from the light source 511. After the light beams 513 pass through the conversion lens module 52 and the collimating lens 54, the light beams 513 are projected on a projection surface 56 outside the casing 53. Consequently, a structured light pattern 5151 is formed on the projection surface 56. The conversion lens module 52 has a linear optical axis A3. In this embodiment, the conversion lens module 52 comprises one conversion lens. That is, the conversion lens module 52 comprises a conversion lens 521. The conversion lens 521 is used for expanding the light beams 513, so that the distribution of the light beams 413 is widened. After expanded light beams 513 pass through the collimating lens 54, the light beams 513 are collimated by the collimating lens 54. Consequently, the plural light beams 513 are substantially in parallel with the optical axis A3. In this embodiment, the conversion lens 521 has negative optical power. That is, the sign of the optical power is (−). Moreover, the collimating lens 54 has positive optical power.

The spatial filter 55 is arranged between the conversion lens module 52 and the optical element group 512. The spatial filter 55 is used for filtering the noise of the plural light beams 513. The arrangement of the spatial filter 55 is presented herein for purpose of illustration and description only. In another embodiment, the spatial filter is arranged between the light source and the conversion lens module. The use of the spatial filter 55 is to filter the noise. However, less number of conversion lenses of the conversion lens module 52 does not certainly increase the noise. In other words, the optical apparatus 5 is equipped with spatial filter 55 according to the practical requirements, but the arrangement of the spatial filter 55 is not relevant to the number of the conversion lenses of the conversion lens module 52.

Figure 8:
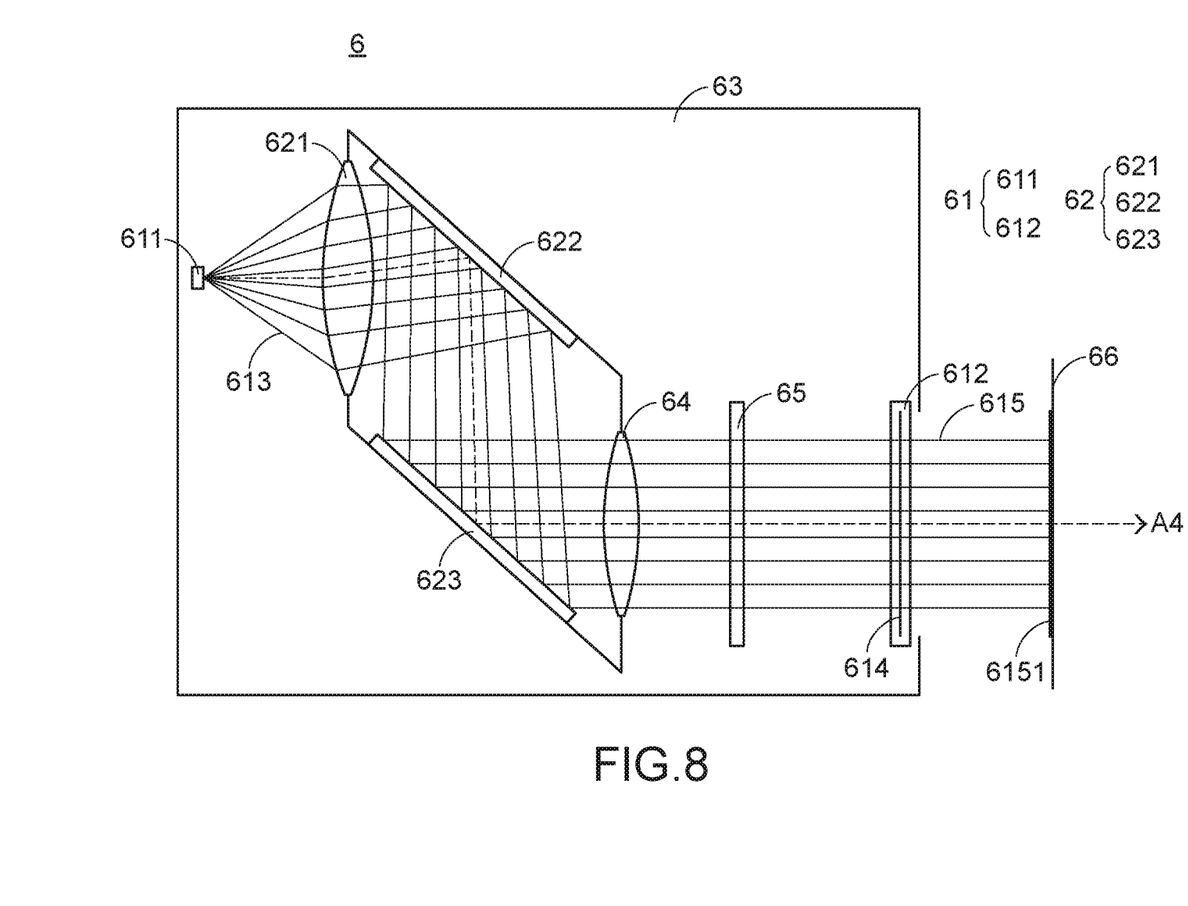
FIG. 8 is a schematic side view illustrating an optical apparatus according to a fourth embodiment of the present invention.

The present invention further provides a fourth embodiment, which is distinguished from the above embodiments. FIG. 8 is a schematic side view illustrating an optical apparatus according to a fourth embodiment of the present invention. As shown in FIG. 8, the optical apparatus 6 comprises a structured light generation unit 61, a conversion lens module 62, a casing 63, a collimating lens 64 and a spatial filter 65. In this embodiment, the structured light generation unit 61 comprises at least one light source 611 and an optical element group 612. Moreover, the optical element group 612 has a projection pattern 614. Except that the structure of the conversion lens module 62 is distinguished and the optical apparatus 6 further comprises the spatial filter 65, the structures of the optical apparatus 6 of this embodiment are substantially identical to those of the optical apparatus 3 of the first embodiment.

The conversion lens module 62 is arranged between the light source 611 and the optical element group 612. The conversion lens module 62 is used for collimating and expanding the plural light beams 613. After the light beams 613 pass through the conversion lens module 62, the light beams 613 are projected on a projection surface 66 outside the casing 63. Consequently, a structured light pattern 6151 is formed on the projection surface 66. In this embodiment, the conversion lens module 62 comprises a first conversion lens 621, a second conversion lens 622 and a third conversion lens 623. The first conversion lens 621 is located near the light source 611 for expanding the plural light beams 613. The second conversion lens 622 is arranged between the first conversion lens 621 and the collimating lens 64. After the plural light beams 613 pass through the first conversion lens 621, the plural light beams 613 are reflected by the second conversion lens 622. The third conversion lens 623 is also arranged between the first conversion lens 621 and the collimating lens 64. The reflected light beams 613 from the second conversion lens 622 are further reflected by the third conversion lens 623 and directed to the collimating lens 64.

In an embodiment, the conversion lens module 62 is a free-form lens module, and the conversion lens module 62 has a non-linear optical axis A4. After the plural light beams 613 are collimated by the collimating lens 64, the included angle between the collimated light beams 613 and the normal vector of the optical element group 612 is smaller than 5 degrees. Preferably, the plural light beams 613 are in parallel with the normal vector of the optical element group 612 (i.e., the vector vertical to the the optical element group 612).

In an embodiment, the numerical aperture (N.A.) of the first conversion lens 621 of the conversion lens module 62 is smaller than 0.8. Moreover, the conversion lens module 62 is specially designed. Consequently, the plural light beams 613 have a desired beam distribution such as a rectangular beam distribution or a ring-shaped beam distribution.

Moreover, the first conversion lens 621 and the collimating lens 64 have anti-reflection coatings. Consequently, the fractions of light beams reflected by the first conversion lens 621 and the collimating lens 64 are reduced, and the fractions of light beams transmitted through the first conversion lens 621 and the collimating lens 64 are increased. On the other hand, the second conversion lens 622 and the third conversion lens 623 have high reflective coatings. Consequently, the second conversion lens 622 and the third conversion lens 623 have the functions of reflecting the light beams 613 and are capable of controlling the beam distribution and the projecting direction of the light beams 613. In some other embodiments, the second conversion lens 622 and the third conversion lens 623 are replaced by other objects with the high reflective coatings.

As mentioned above, the conversion lens module 62 is a free-form lens module capable of expanding and collimating the plural light beams 613. Consequently, the wider structured light 615 is outputted from the optical apparatus, and the structured light pattern 6151 corresponding to the projection pattern 614 is formed on the projection surface 66. In this embodiment, the thickness of the casing 63 is smaller than 4 mm, so that the casing 63 has the slim appearance. Moreover, while the plural light beams 613 pass through the conversion lens module 62, noise is possibly generated. In accordance with the present invention, the arrangement of the spatial filter 65 between the conversion lens module 62 and the optical element group 612 can filter the noise.

In case that the conversion lens module is a free-form lens module, the conversion lens module may have the following variant examples. In a variant example, a first numerical aperture of the first conversion lens in a vertical direction is smaller than 0.6, and a second numerical aperture of the first conversion lens in a horizontal direction is smaller than 0.5. That is, the first conversion lens is asymmetric with respect to the optical axis. Consequently, the curvature of the first conversion lens in the vertical direction and the curvature of the first conversion lens in the horizontal direction are different. Under this circumstance, the first conversion lens is capable of controlling the beam distribution and the projecting direction of the light beams. In a variant example, the collimating lens is asymmetric with respect to the optical axis, and the curvatures of the collimating lens in the vertical direction and in the horizontal direction are different. Under this circumstance, the collimating lens is capable of controlling the beam distribution and the projecting direction of the light beams. In case that the first conversion lens or the collimating lens is asymmetric with respect to the optical axis, the plural light beams outputted from the conversion lens module are deviated from the optical axis. Since the plural light beams are deviated, the optical element group is also deviated. Under this circumstance, the generated structured light is not deviated.

Figure 9:
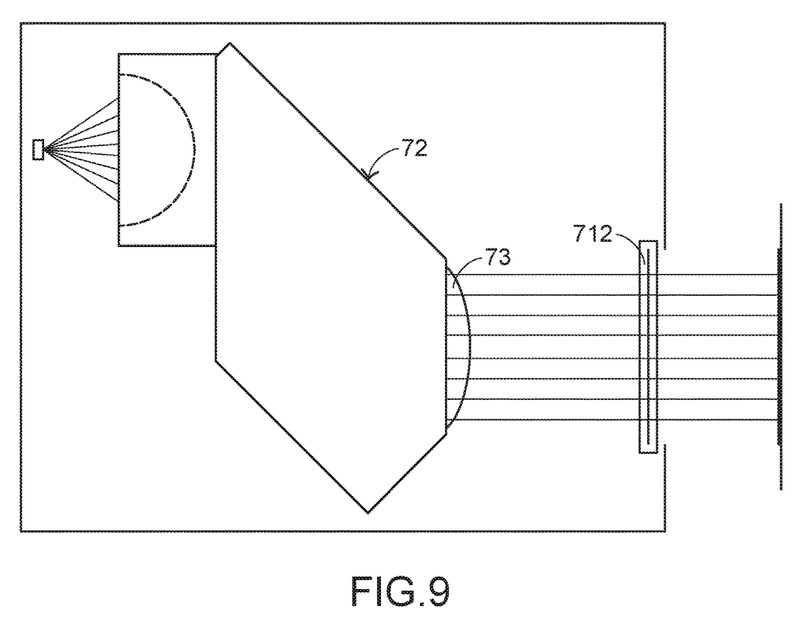
FIG. 9 is a schematic side view illustrating an optical apparatus according to a fifth embodiment of the present invention.

Moreover, the profile of the conversion lens module may be changed according to the application situation of the optical apparatus. FIG. 9 is a schematic side view illustrating an optical apparatus according to a fifth embodiment of the present invention. In this embodiment, the conversion lens module 72 has another free-form lens module and a collimating lens 73 in order to match the optical element group 712. Consequently, the desired structured light is generated.

Preferably but not exclusively, the light source used in the optical apparatus of the present invention includes a small-sized light source, a paraxial light source, a small beam angle light source, a Lambertian light source, a Gaussian light source or a uniform light source. Nevertheless, the other light sources are also suitably used in the optical apparatus of the present invention. For example, a large-sized light source, a non-paraxial light source, a large beam angle light source, a non-Lambertian light source, a non-Gaussian light source, a non-uniform light source (e.g., a bat-wing light source) or an arc-like light source.

From the above descriptions, the optical apparatus of the present invention comprises the negative-power conversion lens module and the positive-power collimating lens. Consequently, even if the thickness of the casing is limited, the light beams can be effectively expanded and collimated. In accordance with this design, the wider structured light is generated, and a wider structured light pattern is shown. Moreover, in case that the conversion lens module is a free-form lens module, the casing is slim and a structured light pattern with an appropriate size is generated. Moreover, since the light beams from the light source are expandable, it is not necessary to decrease the area of the projection pattern of the corresponding optical element group. Under this circumstance, the demand on the assembling tolerance of the optical apparatus is decreased, and thus the assembling process is simplified.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical apparatus, comprising:
a structured light generation unit outputting a structured light, wherein the structured light generation unit comprises at least one light source and an optical element group, wherein the at least one light source emits plural light beams, and the optical element group has a projection pattern, wherein after the plural light beams pass through the projection pattern, the structured light is generated;

a conversion lens module arranged between the at least one light source and the optical element group, and expanding the plural light beams, wherein after the plural light beams pass through the conversion lens module, the plural light beams are projected on a projection surface, so that a structured light pattern is formed on the projection surface, wherein the conversion lens module comprises one or plural conversion lenses, and all of the conversion lenses have negative optical power;

a collimating lens located beside the conversion lens module, wherein the expanded light beams are collimated by the collimating lens; and a casing accommodating the structured light generation unit, the conversion lens module and the collimating lens, wherein the conversion lens module comprises:

a first conversion lens located near the light source for expanding the plural light beams;

a second conversion lens arranged between the first conversion lens and the optical element group, wherein the plural light beams passing through the first conversion lens, once reaching the second conversion lens, are reflected by the second conversion lens; and a third conversion lens arranged between the first conversion lens and the optical element group, wherein the reflected light beams from the second conversion lens are further reflected by the third conversion lens and then directed to the collimating lens.

2. The optical apparatus according to claim 1, wherein the conversion lens module is a free-form lens module, and the conversion lens module has a non-linear optical axis, wherein when the plural light beams are incident on the optical element group, an included angle between the plural light beams and the optical element group is smaller than 5 degrees.

3. The optical apparatus according to claim 1, wherein a numerical aperture of the first conversion lens is smaller than 0.8, and the plural light beams have a rectangular beam distribution or a ring-shaped beam distribution.

4. The optical apparatus according to claim 1, wherein a first numerical aperture of the first conversion lens in a vertical direction is smaller than 0.6, and a second numerical aperture of the first conversion lens in a horizontal direction is smaller than 0.5, wherein the plural light beams have a rectangular beam distribution or a ring-shaped beam distribution.

5. The optical apparatus according to claim 1, wherein the first conversion lens is asymmetric with respect to the optical axis of the conversion lens module, and a curvature of the first conversion lens in a vertical direction and a curvature of the first conversion lens in a horizontal direction are different, so that a beam distribution and a projecting direction of the light beams are controllable.

6. The optical apparatus according to claim 1, wherein at least one of the first conversion lens and the collimating lens has an anti-reflection coating, and at least one of the second conversion lens and the third conversion lens has a high reflective coating, so that a beam distribution and a projecting direction of the plural light beams are controllable.

7. The optical apparatus according to claim 1, wherein the collimating lens is asymmetric with respect to the optical axis of the conversion lens module, and a curvature of the collimating lens in a vertical direction and a curvature of the collimating lens in a horizontal direction are different, so that a beam distribution and a projecting direction of the light beams are controllable.

8. The optical apparatus according to claim 1, further comprising a spatial filter, wherein the spatial filter is arranged between the collimating lens and the optical element group or arranged between the at least one light source and the conversion lens module, wherein the spatial filter filters noise of the plural light beams.

9. The optical apparatus according to claim 1, wherein the optical element group comprises a diffractive optical element, a refractive optical element and/or a refractive array optical element.

10. The optical apparatus according to claim 1, wherein a thickness of the casing is smaller than 6 mm.

11. An optical apparatus, comprising:

a structured light generation unit outputting a structured light, wherein the structured light generation unit comprises at least one light source and an optical element group, wherein the at least one light source emits plural light beams, and the optical element group has a projection pattern, wherein after the plural light beams pass through the projection pattern, the structured light is generated;

a conversion lens module arranged between the at least one light source and the optical element group, and expanding the plural light beams, wherein after the plural light beams pass through the conversion lens module, the plural light beams are projected on a projection surface, so that a structured light pattern is formed on the projection surface;

a collimating lens located beside the conversion lens module, wherein the expanded light beams are collimated by the collimating lens; and a casing accommodating the structured light generation unit, the conversion lens module and the collimating lens, wherein a thickness of the casing is smaller than 4 mm, wherein the conversion lens module comprises:

a first conversion lens located near the light source for expanding the plural light beams:

a second conversion lens arranged between the first conversion lens and the optical element group, wherein the plural light beams passing through the first conversion lens, once reaching the second conversion lens, are reflected by the second conversion lens; and a third conversion lens arranged between the first conversion lens and the optical element group, wherein the reflected light beams from the second conversion lens are further reflected by the third conversion lens and then directed to the collimating lens.

* * * * *